United States Patent Office 2,742,477
Patented Apr. 17, 1956

2,742,477
AMINE SALTS OF 2-CYANO-NAPHTHALENE-1-SULFONIC ACID

Robert S. Long, Bound Brook, and Warren S. Forster, Somerville, N. J., assignors to American Cyanamid Company, New York, N. Y., a corporation of Maine No drawing. Continuation of abandoned application Serial No. 271,860, February 15, 1952. This application January 6, 1953, Serial No. 329,919

19 Claims. (Cl. 260—294.8)

The present invention relates to amine salts of 2-cyano-naphthalene-1-sulfonic acid and methods of preparing them. The new compounds have their principal use as intermediates for the preparation of beta-naphthoic acid.

A number of processes for the preparation of beta-naphthoic acid have been proposed in the past. Most of these processes have had serious drawbacks from the standpoint of yields, purity, operating costs, etc. One of the processes proposed starts with Tobias acid, 2-naphthylamine-1-sulfonic acid; the amino-sulfonic acid is diazotized and reacted with cuprous cyanide in accordance with the well known Sandmeyer reaction; 2-cyanonaphthalene-1-sulfonic acid is obtained and can be hydrolyzed by sulfuric acid to produce beta-naphthoic acid. This process has not achieved practical success because of a number of disadvantages. It is normal to recover the 2-cyano-naphthalene-1-sulfonic acid by means of the conventional salting out feature. Unfortunately, this results in contaminating the product with a large amount of salt and with copper, or copper compounds. Hydrolysis with sulfuric acid liberates large amounts of hydrogen chloride which presents a serious problem of foaming and corrosion. Because of the high solubility of the salt of cyanonaphthalene-1-sulfonic acid, washing out of the contaminating salt is impractical. The copper contamination presents a further problem, because it interferes with smooth hydrolysis. As a result, the yields in the hydrolysis step are poor and side reactions, such as sulfonation, result. Finally, efficient recovery of the copper, which is important economically, is not possible. The process is, therefore, not of value for the practical production of 2-naphthoic acid.

According to the present invention, it has been found that 2-cyanonaphthalene-1-sulfonic acid can be isolated in high yields and high purity in the form of its sparingly soluble salts with organic amines. No salting out is necessary, because of the low solubility of the salts, and contamination from salt is, therefore, not a problem. On the other hand, the amine salts of impurities or by-products, such as 2-naphthol-1-sulfonic acid, are quite soluble and are, therefore, removed simply and efficiently in the precipitation step. Contamination with copper is also avoided by first heating the reaction mixture with acid and then adding alkali to precipitate copper oxide, which can readily be filtered off while the desired product is still in solution.

Another advantage of the present invention is that the amine salts of 2-cyanonaphthalene-1-sulfonic acid are very easily hydrolyzed directly with sulfuric acid of certain concentrations to produce excellent yields of beta-naphthoic acid, while substantially eliminating any side reactions. The preferred range of acid strength is from 50–70% strength. Strengths of acid below 50% result in slow hydrolysis, above 70% some side reactions result, so that the purity of the resulting product is not quite so high. Within the range, optimum results are obtained around a concentration of 60% sulfuric acid, which combines rapid hydrolysis with practically quantitative yields of the product. The hydrolysis proceeds readily by heating under reflux and temperature regulation, therefore, presents no problem.

The organic amines which are used may be of any type, such as aliphatic amines, aryl amines, heterocyclic amines and the like. Typical examples are dibutylamine, triethylamine, aniline, the toluidines, the xylidines, N,N-dimethylaniline, alpha-naphthylamine, chloroanilines, ethylanilines, pyridine, 2-aminothiazole, 3-aminodibenzofuran, etc. It is not known why so many amines show the common property of forming sparingly soluble salts with 2-cyanonaphthalene-1-sulfonic acid, and the invention is not intended to be limited to any theory.

The invention will be described in greater detail in the following examples, the parts being by weight unless otherwise specified.

EXAMPLE 1

*Aniline salt of 2-cyanonaphthalene-1-sulfonic acid*

A solution is prepared from 253 parts of Tobias acid (99.4% pure by nitrite titration), 62.3 parts of anhydrous sodium carbonate and 1000 parts of water. To this is added a solution of 86.0 parts of sodium nitrite (97% pure) in 200 parts of water, followed by an additional 500 parts of water to thin out the orange slurry which is obtained.

The slurry is gradually added to a mixture of 349 parts of concentrated hydrochloric acid and 349 parts of ice at a temperature of 5–10° C. The mixture is then thoroughly stirred. There is then added 15 parts of sodium acetate and 145 parts of 33% sodium hydroxide solution. The resulting orange slurry is filtered, pressed dry, and slurried in 1000 parts of ice and water for the Sandmeyer reaction.

The cyanide solution is prepared by adding 111 parts of cuprous cyanide powder to a solution of 122 parts of sodium cyanide in 500 parts of water. The resulting solution is cooled to 30° C. and the above prepared ice water slurry of the diazo compound is gradually added to it. The temperature is maintained at 35° C.±3°. Antifoam agent is added as needed. When complete reaction of the diazo compound is indicated by a negative color test with a coupling component, 74 parts of concentrated sulfuric acid is added and the solution is brought to reflux. The greater part of the hydrogen cyanide distills out rapidly, the reaction slurry then being made basic to brilliant yellow paper by the addition of approximately 59 parts of 5 N sodium hydroxide solution. The mixture is then filtered to give a yellow pink cake of recovered copper oxides.

To the filtrate is added, in the hot, a solution of 161 parts of aniline hydrochloride in 600 parts of water. The resulting slurry is cooled and filtered. The product is washed with ice water and dried in vacuo at 80° C. An excellent yield is obtained of the aniline salt of 2-cyano-naphthalene-1-sulfonic acid. This salt melts at approximately 228° C.

EXAMPLE 2

*o-Toluidine salt of 2-cyanonaphthalene-1-sulfonic acid*

To a solution of 223 parts of Tobias acid and 55 parts of sodium carbonate in 1500 parts of water, is added a solution of 75.9 parts of sodium nitrite in 200 parts of water. The resulting slurry is added, at a temperature not higher than 8° C., to a slurry of 308 parts of concentrated hydrochloric acid and 308 parts of ice. After thorough stirring, the slurry is carefully neutralized with sodium acetate and 33% caustic soda solution. The diazo compound is filtered.

The necessary cyanide solution is prepared by dissolving 108 parts of sodium cyanide in 500 parts of water, adding 98 parts of cuprous cyanide, and cooling to 15° C. The above prepared diazo compound is slurried in water and ice and added to the cyanide solution at a temperature of 25–30° C. The resulting mixture is then heated to reflux and clarified by filtration. It is made strongly acidic with hydrochloric acid, and there is added a solution of 175 parts of o-toluidine hydrochloride. The resulting slurry is chilled and filtered, giving the o-toluidine salt of 2-cyano-naphthalene-1-sulfonic acid.

EXAMPLE 3

A solution of 2-cyanonaphthalene-1-sulfonic acid sodium salt is prepared exactly as in Example 1, and filtered to remove copper oxides. There is then added a thin slurry of alpha-naphthylamine hydrochloride prepared by mixing hot 178 parts of alpha-naphthylamine with 600 parts of water and adding 120 parts of concentrated hydrochloric acid (specific gravity 1.19). The resulting slurry is cooled, filtered, and dried at 75° C. An excellent yield of alpha-naphthylamine salt of 2-cyano-naphthalene-1-sulfonic acid is obtained.

EXAMPLE 4

To a solution of sodium 2-cyanonaphthalene-1-sulfonate, prepared as in Example 1, is added a solution of 2-aminothiazole hydrochloride prepared by dissolving 124 parts of 2-aminothiazole in warm dilute hydrochloric acid sufficient to neutralize the amine. The resulting slurry is cooled, filtered, and dried at 75° C. An excellent yield of the 2-aminothiazole salt of 2-cyanonaphthalene-1-sulfonic acid is obtained which melts at 193 to 195° uncorrected.

EXAMPLE 5

To a solution of sodium 2-cyanonaphthalene-1-sulfonate, prepared as in Example 1, is added a solution of dibutylamine hydrochloride containing 161 parts of dibutylamine neutralized with an equivalent of hydrochloric acid. The resulting slurry is cooled, filtered, and dried at 75° C. An excellent yield of dibutylamine salt of 2-cyanonaphthalene-1-sulfonic acid is obtained which melts at 149 to 151° C. uncorrected.

EXAMPLE 6

To a solution of sodium 2-cyanonaphthalene-1-sulfonate, prepared as in Example 1, is added a solution of pyridine hydrochloride containing 98 parts of pyridine neutralized with an equivalent amount of hydrochloric acid. The resulting slurry is cooled, filtered, and dried at 75° C. A good yield of pyridine salt of 2-cyanonaphthalene-1-sulfonic acid is obtained which melts at about 190° C.

This application is a division of our co-pending application, Serial No. 271,860, filed February 15, 1952, now abandoned.

We claim:

1. A substantially water-insoluble salt of 2-cyanonaphthalene-1-sulfonic acid and an amine free from water solubilizing groups.

2. A substantially water-insoluble arylamine salt of 2-cyanonaphthalene-1-sulfonic acid the aryl amine being free from water solubilizing groups.

3. A compound according to claim 2 in which the amine is aniline.

4. A compound according to claim 2 in which the amine is ortho-toluidine.

5. A compound according to claim 2 in which the amine is naphthylamine.

6. A compound according to claim 1 in which the amine is an aliphatic amine free from water solubilizing groups.

7. A compound according to claim 6 in which the aliphatic amine is dibutylamine.

8. A substantially water-insoluble heterocyclic amine salt of 2-cyanonaphthalene-1-sulfonic acid, the heterocyclic amine being free from water solubilizing groups.

9. A compound according to claim 8 in which the amine is 2-aminothiazole.

10. A compound according to claim 8 in which the amine is pyridine.

11. In the process of obtaining a salt of 2-cyanonaphthalene-1-sulfonic acid in which 2-naphthylamine-1-sulfonic acid is diazotized, reacted with a cyanide comprising cuprous cyanide to transform the diazo compound into 2-cyano-naphthalene-1-sulfonic acid, the improvement which comprises reacting the 2-cyano-naphthalene-1-sulfonic acid with an amine free from water solubilizing groups to produce a substantially water insoluble amine salt of 2-cyanonaphthalene-1-sulfonic acid and isolating said salt from the reaction mixture.

12. A process according to claim 11 in which the amine is an arylamine.

13. A process according to claim 11 in which the amine is aniline.

14. A process according to claim 11 in which the amine is orthotoluidine.

15. A process according to claim 11 in which the amine is an aliphatic amine.

16. A process according to claim 15 in which the aliphatic amine is dibutylamine.

17. A process according to claim 11 in which the amine is a heterocyclic amine.

18. A process according to claim 11 in which the amine is pyridine.

19. A process according to claim 11 in which the amine is 2-aminothiazole.

References Cited in the file of this patent

FOREIGN PATENTS

| 239,093 | Germany | Sept. 30, 1911 |
| 129,303 | Switzerland | Dec. 1, 1928 |

OTHER REFERENCES

Friedlander et al.: Liebigs Ann., vol. 388, pp. 7–8 (1912).

Basilios: Compt. rend. (Fr. Acad.), vol. 221, pp. 446–8 (1945).